US007697134B1

(12) United States Patent
Sinclair et al.

(10) Patent No.: US 7,697,134 B1
(45) Date of Patent: Apr. 13, 2010

(54) CORRELATION SPECTROMETER

(75) Inventors: Michael B. Sinclair, Albuquerque, NM (US); Kent B. Pfeifer, Los Lunas, NM (US); Jeb H. Flemming, Albuquerque, NM (US); Gary D. Jones, Tijeras, NM (US); Chris P. Tigges, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 597 days.

(21) Appl. No.: 11/593,386

(22) Filed: Nov. 6, 2006

Related U.S. Application Data

(60) Provisional application No. 60/733,637, filed on Nov. 4, 2005.

(51) Int. Cl.
G01J 3/04 (2006.01)
(52) U.S. Cl. .................. 356/310; 356/319; 356/326
(58) Field of Classification Search ............. 356/310, 356/319, 326–330
See application file for complete search history.

(56) References Cited

U.S. PATENT DOCUMENTS

| | | | | |
|---|---|---|---|---|
| 3,955,891 | A | * | 5/1976 | Knight et al. ............... 356/310 |
| 5,815,261 | A | * | 9/1998 | Brooks et al. ............... 356/310 |
| 5,905,571 | A | | 5/1999 | Butler et al. |
| 6,996,292 | B1 | * | 2/2006 | Gentry et al. ............... 382/281 |
| 7,126,686 | B2 | * | 10/2006 | Tsujita ........................ 356/328 |
| 2002/0105725 | A1 | * | 8/2002 | Sweatt et al. ............... 359/566 |

OTHER PUBLICATIONS

Martin Harwit et al, "Hadamard Transform Optics", Bell Telephone Laboratories, Inc., Copyright 1979, Academic Press, Inc., ISBN 0-12-330050-9 .
Richard Goody, "Cross-Correlating Spectrometer", Journal of the Optical society of America, 1968, vol. 58, No. 7, pp. 900-908.
Michael B. Sinclair et al, "Synthetic spectra: a tool for correlation spectroscopy," Applied Optics, May 20, 1997, vol. 36, No. 15, pp. 3342-3348.
M.B. Sinclair et al, "Synthetic Infrared spectra," Optics Letters, 1997, vol. 22, No. 13, pp. 1036-1038.
Michael B. Sinclair et al, "A MEMS—Based Correlation radiometer," Proceedings of SPIE, vol. 5346, 2004, pp. 37-47.
Mark W. Smith et al, "Theoretical description and numerical simulations of a simplified Hadamard transform imaging spectrometer," Proc. of SPIE, vol. 4816, 2005, pp. 372-380.
Christine M. Wehlburg et al, "Optimization and Characterization of an Imaging Hadamard Spectrometer," Proc. of SPIE, 2001, vol. 4381, pp. 506-515.
Marian Hanf et al,."A dynamically driven micro mirror array as the encoding mask in a Hadamard transform spectrometer (HTS)," Sensors and Actuators A 123-124, (2005) pp. 476-482.

* cited by examiner

*Primary Examiner*—L. G. Lauchman
(74) *Attorney, Agent, or Firm*—Kevin W. Bieg

(57) ABSTRACT

A correlation spectrometer can detect a large number of gaseous compounds, or chemical species, with a species-specific mask wheel. In this mode, the spectrometer is optimized for the direct measurement of individual target compounds. Additionally, the spectrometer can measure the transmission spectrum from a given sample of gas. In this mode, infrared light is passed through a gas sample and the infrared transmission signature of the gasses present is recorded and measured using Hadamard encoding techniques. The spectrometer can detect the transmission or emission spectra in any system where multiple species are present in a generally known volume.

20 Claims, 9 Drawing Sheets

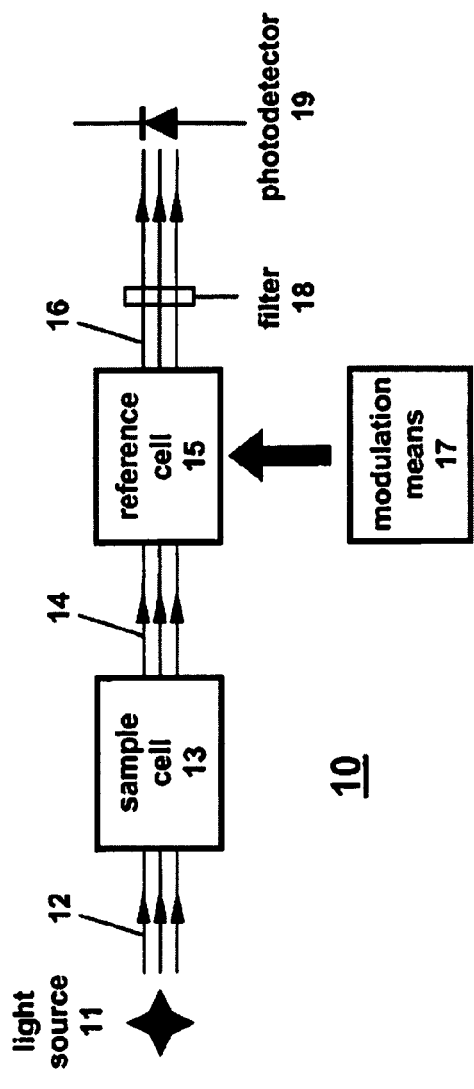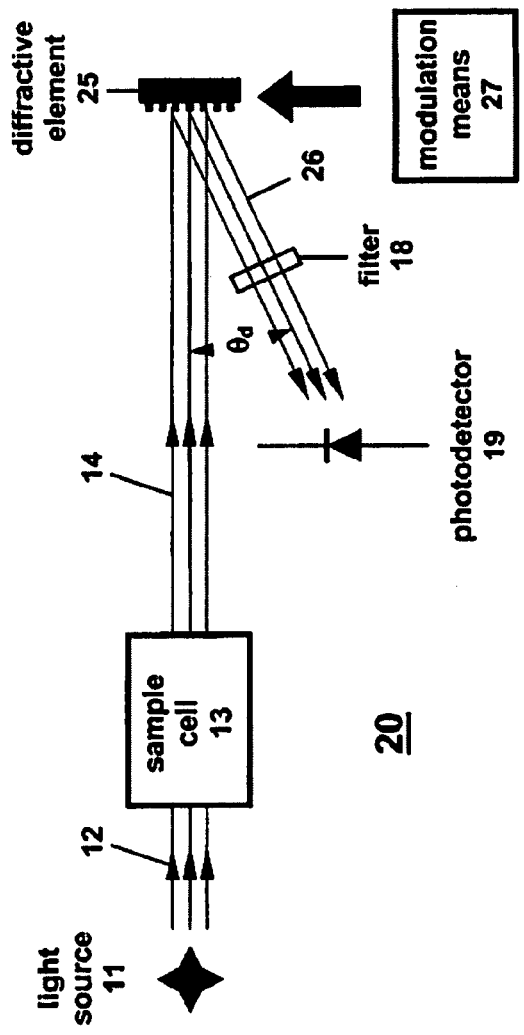
FIG. 1A (Prior Art)
FIG. 1B (Prior Art)

CORRELATION SPECTROMETER

CROSS-REFERENCE TO RELATED APPLICATION

This application claims the benefit of U.S. Provisional Application No. 60/733,637, filed Nov. 4, 2005, which is incorporated herein by reference.

STATEMENT OF GOVERNMENT INTEREST

This invention was made with Government support under contract no. DEAC04-94AL85000 awarded by the U.S. Department of Energy to Sandia Corporation. The Government has certain rights in the invention.

FIELD OF THE INVENTION

The present invention relates to correlation spectroscopy and, in particular, to a correlation spectrometer that uses species-specific masks to provide species-specific spectral filtering of a sample spectrum to determine the concentration of a target compound in a sample.

BACKGROUND OF THE INVENTION

Correlation spectroscopy is an attractive technique for sensing and analysis applications because it combines the attributes of mechanical and optical simplicity, high selectivity, and good sensitivity. In correlation spectroscopy, the degree of correlation between the transmission of an unknown sample and a reference cell containing a known target compound, or chemical species, is determined over a fixed spectral range. For materials, such as gases, that are characterized by narrow absorption lines, the cross correlation between the transmission spectra of different compounds can usually be neglected, and a significant correlation will be observed only when the sample and reference cells contain the same chemical species. Therefore, excellent selectivity is obtained. Unfortunately, because of the need for many reference cells containing target compounds, conventional correlation spectrometers tend to be large and unwieldy, and construction of spectrometers capable of detecting a large number of chemical species is impractical.

In FIG. 1A is shown a schematic illustration of a conventional transmissive correlation spectrometer 10. Broadband light 12 from a light source 11 first passes through a sample cell 13 containing an unknown sample to provide a sample transmission spectrum 14. The sample transmission spectrum light 14 then passes through a reference cell 15 containing a known target compound (or mixture of target compounds) to provide a reference transmission spectrum 16. Thus, the reference cell 15 functions as a complex spectral filter whose transmission spectrum is perfectly correlated with that of the target compound. To measure the degree of correlation between the two spectra 14 and 16, the transmission spectrum 16 of the reference cell 15 can be modulated by a suitable modulation means 17 (e.g., pressure or electric-field modulation of the linewidth), and the output of a single-channel broadband photodetector 19 at the modulation frequency is recorded. If the spectra 14 and 16 of the sample 13 and the reference 15 are highly correlated (i.e., both the sample cell 13 and the reference cell 15 contain the same chemical species), a large fractional modulation of the transmitted intensity will be recorded by the detector 19. Conversely, when the target compound is not present in the sample cell 13, the fractional modulation will be small. The output of the detector 19 at the modulation frequency then provides a measure of the degree of correlation between the sample and the target compound. Measurement of the degree of correlation between the transmission spectrum emerging from the sample cell and the transmission spectrum of the reference cell thereby allows the concentration of the target compound in the unknown sample to be determined. See R. Goody, "Cross-correlating spectrometer," *J. Opt. Soc. Am.* 58, 900 (1968).

For high selectivity and good sensitivity, it is important that the spectral range used in determining the cross correlation is large enough to encompass several absorption bands of the target compound. An important requirement of any modulation method is the maintenance of a constant spectrally integrated transmission of the reference cell to minimize any background modulation of the transmitted light. Further, the transmission spectra for many compounds of interest are characterized by narrow, isolated, absorption bands and thus are near unity for most wavelengths. For these compounds, a large background of unmodulated radiation will reach the detector, since the overall transmission will be modulated only in spectral regions where the reference absorbs and the magnitude of the fractional modulation of the transmitted light will be limited. Because the relatively sharp spectral lines absorb only a small fraction of the light in a broad wavelength band, the detector must respond to a small, modulated signal superimposed on a large DC background. This severely limits the detector's dynamic range and raises the noise level. To overcome this difficulty, the total spectrum of light that is allowed to reach the detector is usually limited by means of a bandpass filter 18 to one or more regions near important absorption bands.

In FIG. 1B is shown a schematic illustration of a holographic correlation spectrometer wherein the reference cell 15 is replaced with a diffractive optical element 25 that synthesizes a desired spectral transfer function corresponding to a target compound at a predetermined diffraction angle $\theta_d$. The spectral transfer function is modulated in a suitable fashion by modulation means 27 and the modulated output of the broadband photodetector 19 is measured. The diffractive element 25 can operate in either a reflective (as shown) or a transmissive mode. In this configuration, the total power measured by the detector at the diffraction angle $\theta_d$ is determined by the cross correlation between the transmission spectrum 14 of the sample cell 13 and the diffraction efficiency spectrum 26 of the diffractive element 25 (at $\theta_d$). If the synthetic reference spectrum of the diffractive element 25 closely corresponds to the absorption spectrum of the target compound of interest, then the effect of the diffractive element 25 is analogous to that arising from a reference cell 15 containing a physical target compound. See M. B. Sinclair et al., "Synthetic spectra: a tool for correlation spectroscopy," *Appl. Optics* 36(15), 3342 (1997); and M. B. Sinclair et al., "Synthetic infrared spectra," *Optics Lett.* 22(13), 1036 (1997).

The use of diffractive elements to produce synthetic reference spectra has several advantages over the use of reference cells containing real physical target compounds. First, the diffractive elements can be extremely compact, allowing many to be stored on a common substrate. Alternatively, a single programmable diffraction grating can be used to recreate the spectra of a large number of materials. Thus, a correlation spectrometer relying on synthetic spectra can easily be configured to analyze for many compounds, eliminating the need for different, bulky reference cells. Second, the diffractive elements can be designed using multivariate analysis to reproduce only a subset of the target spectrum. This is desirable in situations where interference from overlapping absorption of other non-target compounds is expected. Reproducing only those portions of the target spectrum that are free from chemical interferences will increase selectivity. Third, the diffracted light spectrum can be modulated in ways not possible with real reference materials. In the case of simple wavelength modulation, the magnitude of the modulation can be significantly larger than can be achieved with a real reference material. More complex forms of modulation can be used. In this way, both the sensitivity and the selectivity of the spectrometer can be optimized for a given application. As described above, the spectrally integrated diffraction efficiency must remain constant to avoid spurious intensity modulation of the reflected optical spectrum. Fourth, diffractive elements can be designed to simulate materials that are difficult to handle (e.g., highly reactive, toxic, or caustic materials) or transient chemical species whose lifetimes are too short to allow their use as reference materials. Fifth, since there is spatial information in the direction perpendicular to the diffraction plane, an imaging correlation spectrometer can be developed by modifying a simple synthetic correlation spectrometer to include a detector array and push-broom collection optics. Finally, using dark-field correlation sensing (DFCS), the fractional modulation of the detected power (and, hence, the signal-to-noise ratio) can be larger when the reference spectrum is synthesized to be the complement of the transmission spectrum of the target compound. Then all wavelengths other than those matching absorbances of the target compound are blocked and only a small percentage of the incident light is transmitted. When the incoming light had spectral absorption lines matching the position of the programmed, modulated "transmission-complement" lines, a large modulation of the output occurs. However, now the modulation occurs against a relatively dark rather than bright background, with a manifold improvement in signal-to-background ratio and associated enhancement of the limit of detection, thereby reducing the difficultly of detecting a small AC signal on a large DC background by removing most of the DC background.

The production of synthetic spectra using diffractive elements requires that, at a fixed diffraction angle, the diffracted light spectrum accurately reproduces a desired spectrum. To maximize the intensity of the diffracted light spectrum, an element that imposes only a phase modulation on the incident light is preferable. Computer-generated diffractive optical elements can also be used to synthesize the infrared spectra of target compounds. These elements can be used to replace the reference cell in a conventional correlation spectrometer. A large number of such diffractive elements can be stored as phase gratings in a compact-disk-like format or a programmable diffractive grating can be used to enable the spectrometer to quickly characterize unknown samples.

However, the fabrication of such diffractive elements is difficult and the optical design of such holographic correlation spectrometers is complex, making miniaturization difficult. Therefore, a need remains for a simple correlation spectrometer that can be miniaturized.

SUMMARY OF THE INVENTION

The present invention is directed to a correlation spectrometer, comprising an entrance aperture for allowing sample spectrum light from the sample to enter the spectrometer; a collimating section for collimating the sample spectrum light from the entrance aperture onto a diffraction grating, wherein the diffraction grating spectrally disperses the sample spectrum light; a telecentric imaging section for focusing the spectrally dispersed light onto a mask wheel, the mask wheel comprising a region of coded masks to provide spectral filtering of the sample spectrum light; and a broadband photodetector for recording the spectrally filtered sample spectrum light. The mask wheel can comprise a reflective mask wheel, wherein the coded masks cause the desired spectral bands to be reflected and the undesired spectral bands to pass on a wavelength-by-wavelength basis. Alternatively, the mask wheel can comprise a transmissive mask wheel, wherein the coded masks cause undesired spectral bands to be reflected and the desired spectral bands to pass on a wavelength-by-wavelength basis. For example, the mask wheel can comprise a chemical species-specific Eigen mask, for measuring the concentration of the target compound in the sample, or a Hadamard mask for measuring the transmission or emission spectrum of the sample.

The present invention is further directed to another correlation spectrometer, comprising an entrance aperture for allowing sample spectrum light from the sample to enter the spectrometer; a collimating section for collimating the sample spectrum light from the entrance aperture onto a diffraction grating, wherein the diffraction grating spectrally disperses the sample spectrum light; an imaging section for focusing the spectrally dispersed light onto a plurality of photodetector channels, each channel comprising an integral species-specific mask, for providing species-specific spectral filtering of the sample spectrum light incident on each channel.

Below are described the optical layouts of several exemplary embodiments of the correlation spectrometer of the present invention. It will be apparent to those having skill in the art that other optical layouts are possible that use coded masks to provide species-specific spectral filtering of a sample spectrum.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 1A shows a schematic illustration of a conventional transmissive correlation spectrometer. FIG. 1B shows a schematic illustration of a holographic correlation spectrometer.

DETAILED DESCRIPTION OF THE INVENTION

The present invention is directed to a correlation spectrometer that can detect a large number of gaseous compounds, or chemical species, with a species-specific mask wheel. In this mode, the spectrometer is optimized for the direct measurement of individual target compounds. Additionally, the spectrometer can measure the transmission spectrum from a given sample of gas. In this mode, infrared light is passed through the gas sample and the infrared transmission signature of the gasses present is recorded and measured using Hadamard encoding techniques. The spectrometer can detect the transmission spectra in any system where multiple species are present in a generally known volume. For example, the spectrometer can detect the combusted gases found in the primary or secondary flue of gas furnaces (e.g., water, carbon dioxide, carbon monoxide, methane, and ethane). Other applications can be found in clean room environments, exhaust testing stations (cars, buildings, etc.), stand-off detection applications, etc.

Figure 2A:
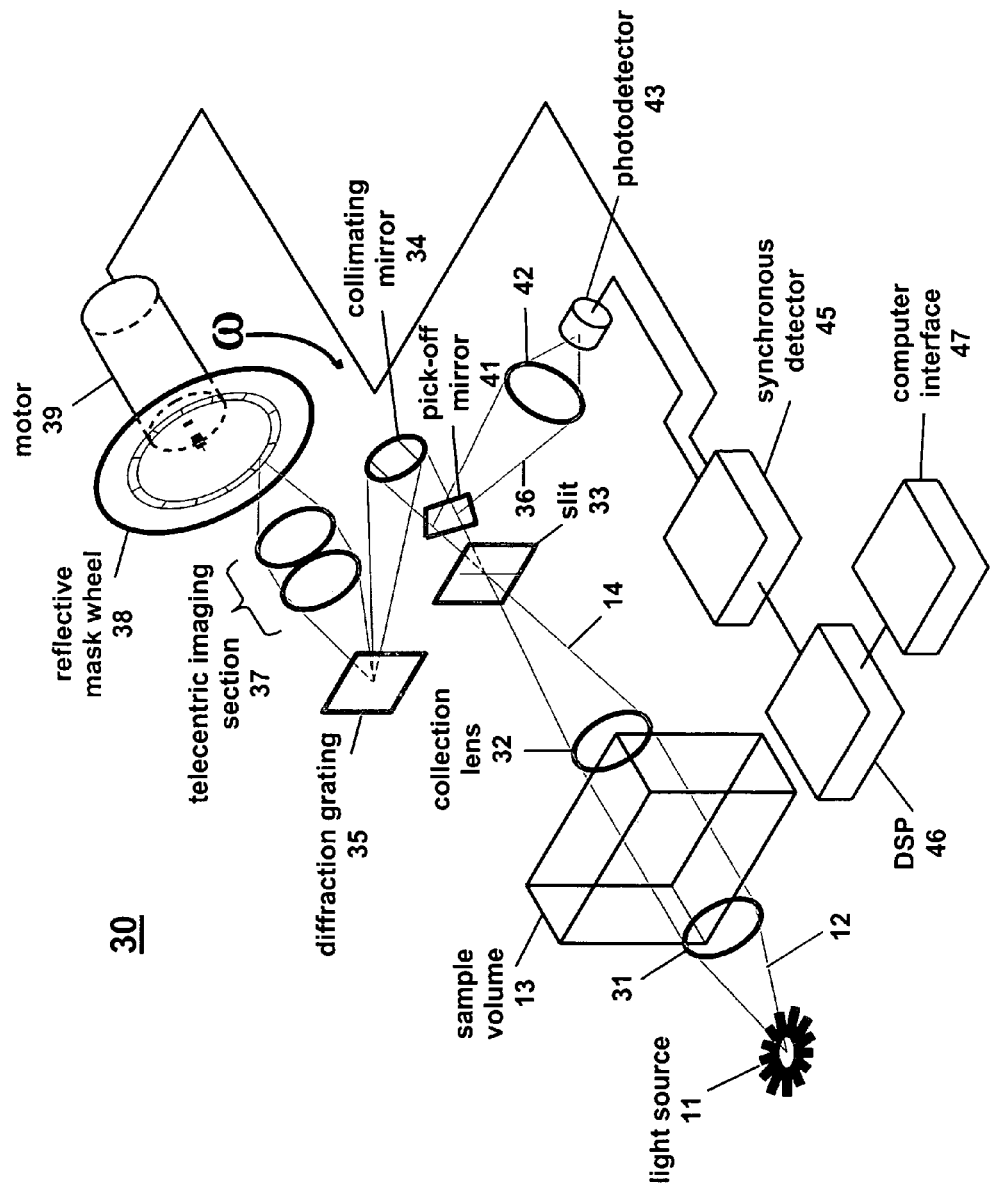
FIG. 2A shows a perspective view schematic illustration of a reflective mask wheel correlation spectrometer.
Figure 2B:
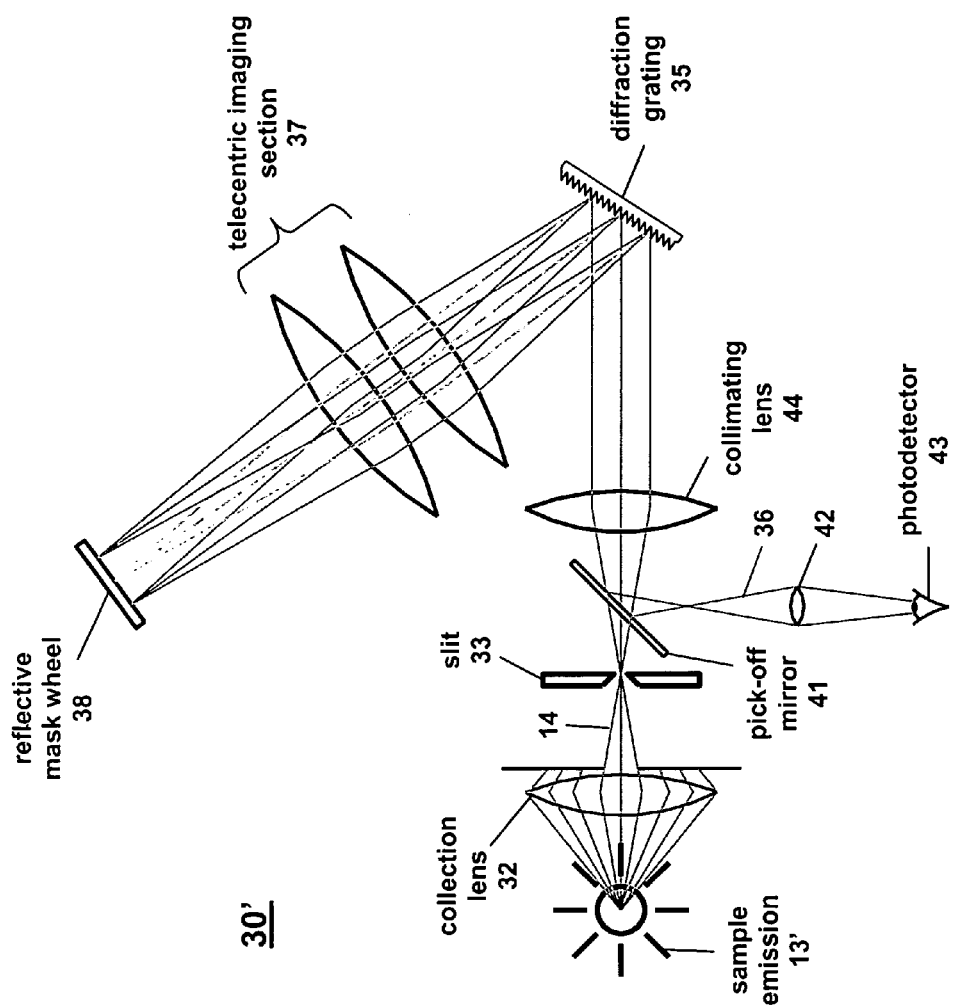
FIG. 2B shows a top view optical layout of a reflective mask wheel correlation spectrometer.

In FIG. 2A is shown a perspective view schematic illustration of an exemplary reflective mask wheel correlation spectrometer 30. In FIG. 2B is shown a top view optical layout of a similar reflective mask wheel correlation spectrometer 30'. The spectrometer optics comprise several mirrors, a conventional diffraction grating, lenses, a reflective mask wheel, and an infrared light source. In FIG. 2A, infrared light 12 from a broadband infrared light source 11 is collimated by a lens 31 and passes through a sample volume 13. The transmitted sample spectrum light 14 is collected by a lens 32 and enters the spectrometer through a slit, input optical fiber, or similar entrance aperture 33. Alternatively, as shown in FIG. 2B, the sample spectrum 14 can be light emitted from a fluorescent sample volume 13'. The spectrometer comprises a collimating section for collimating the light from the slit 33 onto a diffraction grating 35 where it is dispersed into its component wavelengths. In the example spectrometer shown in FIG. 2A, the collimating section comprises an off-axis parabolic mirror 34 that collimates the sample light from the focal point at the slit 33 and directs the collimated light onto the diffraction grating 35 without central obscuration of the reflected light. Alternatively, as shown in FIG. 2B, the collimating section can comprise a collimating lens 44 that collimates the sample light onto the diffraction grating 35. The diffraction grating 35 spectrally disperses the sample light 14 which is then focused by a telecentric imaging section 37 onto a reflective mask wheel 38. The imaging section 37 causes the separated wavelengths to be imaged at near-normal incidence onto the mask wheel 38. The mask wheel 38 contains the coded masks corresponding the target compound spectra to be correlated with the captured sample light 14. For each desired spectral component a reflective region is fabricated on the mask at the precise location where the image of the entrance aperture corresponding to that spectral component will be formed. For each undesired spectral component, a transparent region is fabricated at the precise location where the image of the entrance aperture corresponding to that spectral component will be formed. Hence, only the desired spectral bands are retro-reflected on a wavelength-by-wavelength basis back to the diffraction grating 35 where all the desired spectral components are recombined into a single beam.

The telecentric imaging section 37 ensures that the returning spectrally filtered sample spectrum light beam 36 will be spatially distinct from the incident sample spectrum light beam 14 at some location along the beam path so that the return beam 36 can be directed by a pick-off mirror 41 onto a single-channel broadband photodetector 43. The telecentric imaging section 37 can comprise an off-center telecentric lens (as shown). Alternatively, the telecentric imaging section can comprise a centered telecentric lens and a roof prism or periscope to separate the reflected spectrally filtered sample spectrum light beam 36 from the incident light beam 14. The intensity of the filtered return beam 36 is recorded by the photodetector 43 in conjunction with electronic measurement hardware. The electronic measurement hardware can comprise a synchronous detector 45, digital signal processor (DSP) 46, and computer interface 47 that drive the motor 39 responsible for rotating the mask wheel 38 and synchronize the output of the photodetector 43 with the relative position of the mask wheel 38. Therefore, the photodetector output corresponding to each of the coded masks on the wheel 38 can be determined.

The design of the optical detection hardware including the photodetector is governed by the wavelength of interest and absorption spectra of the target compounds to be detected. In general, the photodetector should have a responsivity that is nearly constant over the wavelength range. For example, a HgCdTe detector can be constructed as a semiconductor diode, but for some applications a photoconducting detector can be used. The primary factors to consider in the selection the photodetector include sufficient electronic bandwidth to monitor the modulation frequency, and high responsivity and detectivity in the wavelength range of interest to allow for high signal-to-noise ratio measurements.

Figure 3:
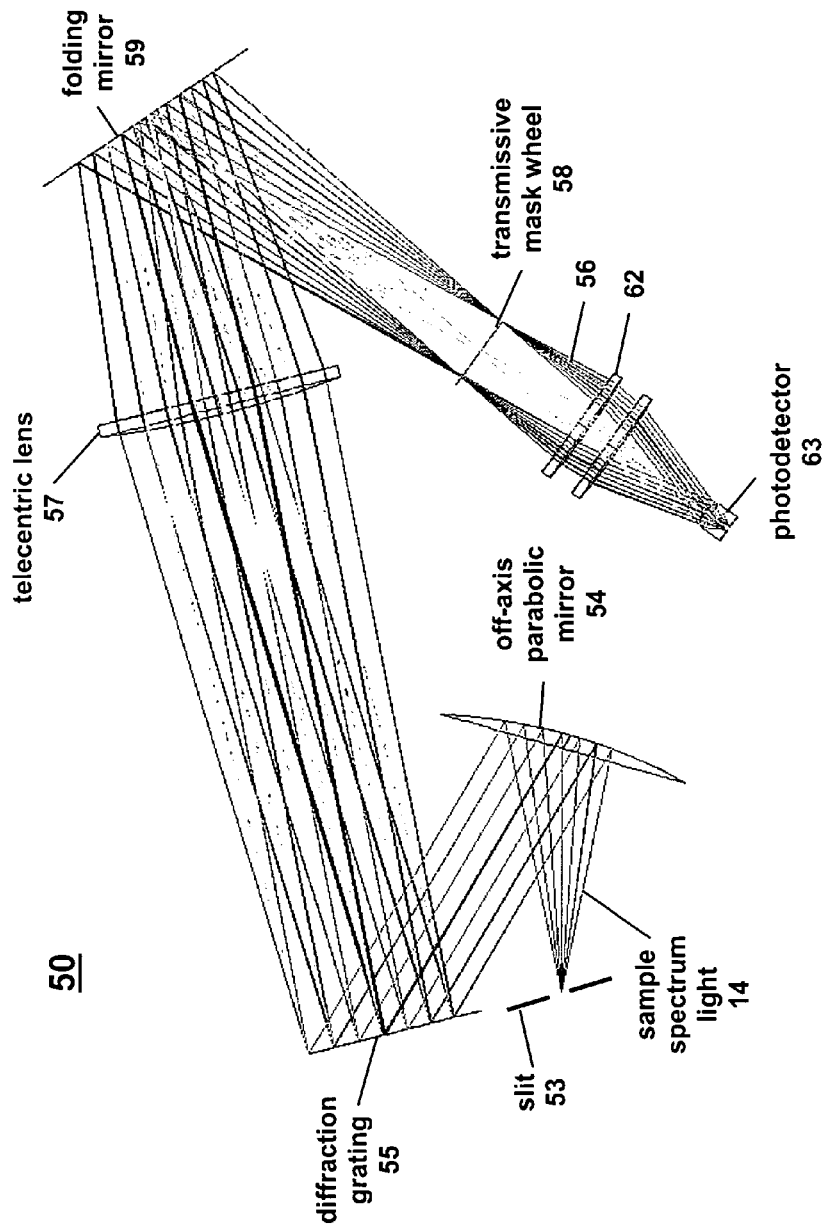
FIG. 3 shows a top view optical layout of a transmissive mask wheel correlation spectrometer.

In FIG. 3 is shown a top view optical layout of an exemplary transmissive mask wheel correlation spectrometer 50. The spectrometer optics comprise several mirrors, a conventional diffraction grating, lenses, a transmissive mask Wheel, and an infrared light source. Sample spectrum light 14 that is transmitted through or emitted from a sample enters the spectrometer 50 through a slit, input fiber, or similar aperture 53. The spectrometer comprises a collimating section for collimating the sample spectrum light 14 onto a diffraction grating 55 where it is dispersed into its respective wavelengths. In the exemplary spectrometer shown, the collimating section comprises an off-axis parabolic mirror 54 that takes the light from the slit 53 and collimates the reflected light onto the diffraction grating 55 without central obscuration of the reflected light. Spectrally dispersed sample light is reflected from the diffraction grating 55 and imaged onto a transmissive mask wheel 58 with a telecentric lens 57 and a folding mirror 59. The separated wavelengths are imaged at near-normal incidence onto the mask wheel 58 that contains the coded masks corresponding to the target compound spectra to be correlated with the captured sample light 14. Here, undesired spectral bands are reflected, while desired spectral bands 56 are allowed to pass on a wavelength-by-wavelength basis through the transmissive mask wheel 58. The transmitted light 56 is then focused by a lens 62 onto a single-channel broadband photodetector 63 and the detected light is recorded by electronic measurement hardware (not shown). The photodetector 63 can have the same requirements as those of the reflective mode photodetector in FIGS. 2A and 2B.

Figure 4:
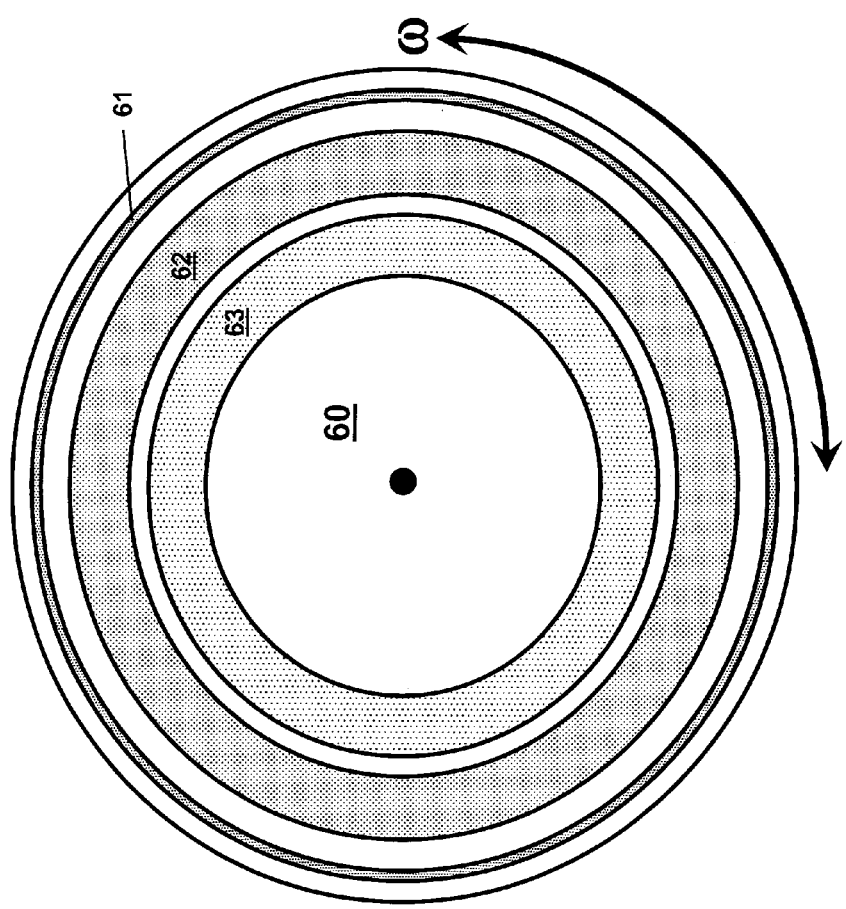
FIG. 4 shows a mask wheel comprising synchronous, Eigen, and Hadamard regions.

In FIG. 4 is shown an exemplary circular mask wheel 60 that can be a reflective 38 or transmissive 58 mask wheel. The exemplary mask wheel 60 can comprise three radial regions; a radial collection of position fiducial markers 61 for monitoring the mask position, Hadamard masks 62, and chemical species-specific masks 63 referred to as "Eigen" masks. The position fiducial markers 61, comprise an alternating series of metallization (reflectance) and no metal (transmission) patterns. This synchronization region 61 of the mask wheel 60 is read by an optical reflectance circuit and used by the synchronous detector 43 or 63 to associate each photodetector measurement with the particular mask that is illuminated at that instant. The wheel 60 can be mounted on a mechanical rotation platform that can be rotated by a motor 39.

Figure 5:
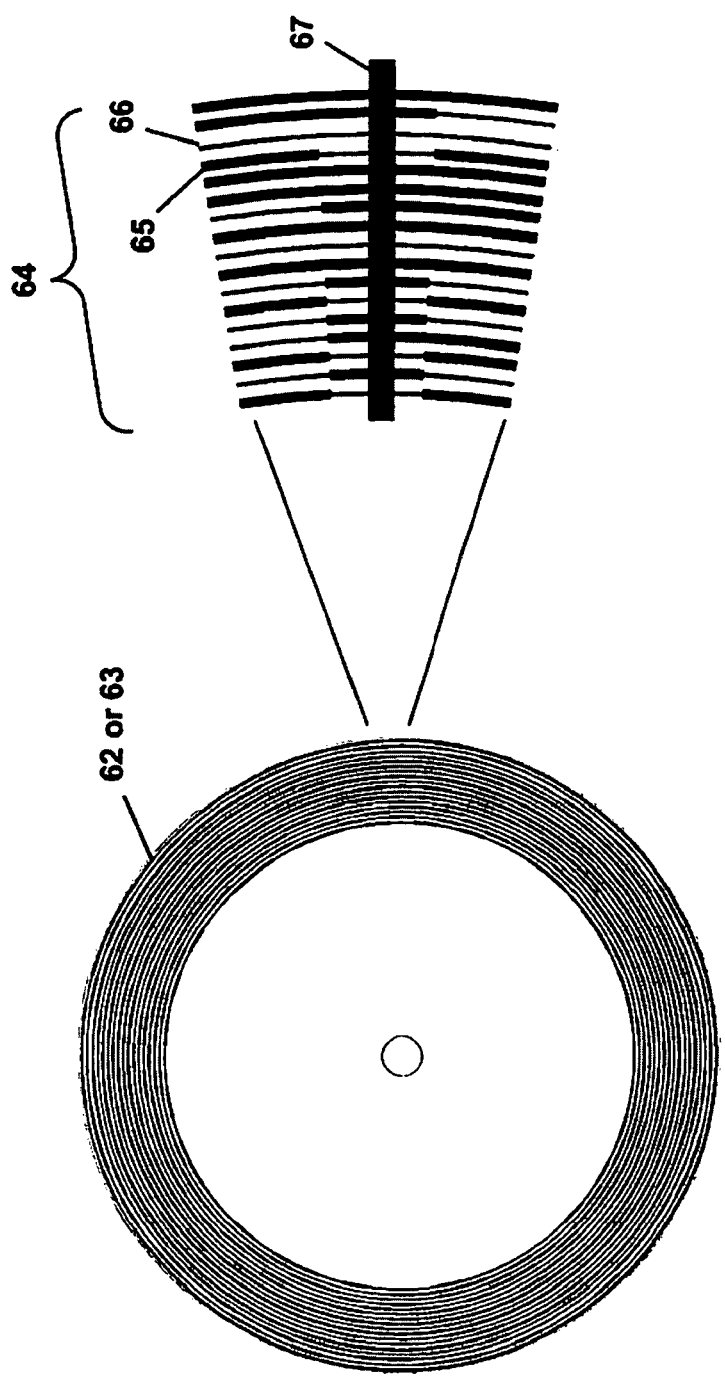
FIG. 5 shows a typical pattern on the circular mask wheel.

In FIG. 5 is shown a schematic illustration of a typical pattern on the circular mask wheel 60. A barcode-type pattern 64 of transmitting 65 or reflecting 66 segments encodes spectral information in a dimension that is perpendicular to the entrance slit 33 or 53. The long axis of the slit comprising the spectrally dispersed sample light 67 is oriented in the radial direction.

One radial region 63 of the mask wheel 60 can comprise alternating pairs of Eigen masks. The Eigen masks can be designed for reflective or transmissive operation. A transmissive Eigen mask can be determined by employing an a priori knowledge of the transmission spectra of the target species. Using this information, a mathematical algorithm can be employed to determine the optimal mask set which maximizes the response to the species of interest, while simultaneously minimizing the response of the system to spectrally interfering compounds. This approach leads to a matrix equation that is solved for the appropriate reference spectra using Singular Value Decomposition (SVD). The SVD method is very general. It assumes that two spectral masks will alternately be placed in the beam, but does not assume that one mask is simply a shifted copy of the other. In general, the two masks bear very little resemblance to one another. See W. H. Press et al., *Numerical Recipes in C: The Art of Scientific Computing*, Second Edition, Chap. 2 (Cambridge University Press, New York, N.Y., 1997); and M. B. Sinclair et al., "A MEMS-Based Correlation Radiometer," *Proc. IEEE* 5346, 37 (2004).

To formulate a mathematical description of the sensing task, a given a set of target species (A,B,C . . . ) is assumed that are potentially present in a sample volume, and an input radiance spectrum. The set of reference spectra ($a^+$, $a^-$, $b^+$, $b^-$ . . . ) is determined that optimizes the selectivity of correlation-based sensing of these species. When probing for species A, the radiometer will alternately produce the reference spectra $a^+$ and $a^-$, and the modulation of the spectrally integrated intensity reaching the detector will be measured. In a similar manner, reference spectra $b^+$ and $b^-$ are used to detect species B. Ideally, each pair of reference spectra will produce a modulation signal only if the target species for which the pair was designed is present. The input sample spectrum is given by $$I(v) = I^0(v) \cdot e^{-L \cdot [A(v) \cdot c_a + B(v) \cdot c_b + \ldots]} \tag{1}$$

where L is the sample path-length, $A(v)$ and $c_a$ are the absorption spectrum and concentration of species A. For small concentrations where the exponent is a small number, Eq. (1) can be approximated as:

$$I(v) = I^0(v) - I^0(v) A(v) \cdot c_a L - I^0(v) B(v) \cdot c_b L - \ldots \tag{2}$$

The reference spectra $a^+$ and $a^-$ for the detection of species A should satisfy the following integral equations:

$$\int_{v_1}^{v_2} dv I^0(v)[a^+(v) - a^-(v)] = 0 \tag{3}$$

$$\int_{v_1}^{v_2} dv I^0(v) A(v)[a^+(v) - a^-(v)] = S^A \neq 0$$

$$\int_{v_1}^{v_2} dv I^0(v) B(v)[a^+(v) - a^-(v)] =$$

$$\int_{v_1}^{v_2} dv I^0(v) C(v)[a^+(v) - a^-(v)] = \ldots = 0$$

These equations simply state that, when reference spectra $a^+$ and $a^-$ are used, a signal should only be generated if species A is present. Likewise a similar set of equations can be written for species B etc.

These equations can be written in discrete form as $$\sum_i I_i^0 \cdot \tilde{a}_i = 0 \tag{4}$$

$$\sum_i I_i^0 \cdot A_i \cdot \tilde{a}_i = S^A \neq 0$$

$$\sum_i I_i^0 \cdot B_i \cdot \tilde{a}_i = \sum_i I_i^0 \cdot C_i \cdot \tilde{a}_i = \ldots = 0$$

where the "eigenspectrum" for species A has been defined as $$\tilde{a}_i \equiv a_i^+ - a_i^- \tag{5}$$

In matrix form, these equations become:

$$\begin{pmatrix} I_1^0 & I_2^0 & \ldots & I_N^0 \\ I_1^0 A_1 & I_2^0 A_2 & \ldots & I_N^0 A_N \\ I_1^0 B_1 & I_2^0 B_2 & \ldots & I_N^0 B_N \\ I_1^0 C_1 & I_2^0 C_2 & \ldots & I_N^0 C_N \\ \vdots & & \ddots & \end{pmatrix} \begin{pmatrix} \tilde{a}_1 \\ \tilde{a}_2 \\ \tilde{a}_3 \\ \vdots \\ \tilde{a}_N \end{pmatrix} = \begin{pmatrix} 0 \\ S^A \\ 0 \\ \vdots \\ 0 \end{pmatrix} \tag{6}$$

Similarly for species B:

$$\begin{pmatrix} I_1^0 & I_2^0 & \ldots & I_N^0 \\ I_1^0 A_1 & I_2^0 A_2 & \ldots & I_N^0 A_N \\ I_1^0 B_1 & I_2^0 B_2 & \ldots & I_N^0 B_N \\ I_1^0 C_1 & I_2^0 C_2 & \ldots & I_N^0 C_N \\ \vdots & & \ddots & \end{pmatrix} \begin{pmatrix} \tilde{b}_1 \\ \tilde{b}_2 \\ \tilde{b}_3 \\ \vdots \\ \tilde{b}_N \end{pmatrix} = \begin{pmatrix} 0 \\ 0 \\ S^B \\ \vdots \\ 0 \end{pmatrix} \tag{7}$$

It is not possible to obtain explicit solutions to these matrix equations, since they involve more unknowns than equations. However, it is possible to obtain the best solution (in a least-squares sense) using SVD, and back-substitution. To do this, the coefficient matrix is padded with rows of zeros to form a square matrix, SVD is applied, and back-substitution is employed to obtain the difference spectrum. This procedure is repeated to obtain the eigenspectrum for each target species. Using this method, multiple Eigen A-B pairs (representing a unique cross-correlation) can be fabricated along the circumference of the mask wheel. For example, using a five-inch-diameter silicon wafer as the mask wheel, up to 71 discrete compounds can be measured using this method.

Another region 62 of the mask wheel 60 can comprise Hadamard masks to measure the transmission or emission spectrum from a given sample. The pattern 64 can be a Hadamard pattern wherein each pattern represents about 360°/n of arc for an n bit Hadamard pattern. For example, each Hadamard mask can comprise 283 adjacent segments. These segments are either transmissive or reflective in nature. Adjacent Hadamard masks in a region comprise the same mask architecture; however, a cyclic permutation by one segment is performed for each new adjacent mask. This process is repeated 283 times, until the cycle is complete. To measure a spectrum, the incoming light is sequentially filtered with each of the Hadamard masks, and the photodetector output is recorded. An inverse transformation procedure is then employed to recover the spectrum of the incoming light from the ensemble of photodetector measurements. Using this method, one obtains the transmission or emission spectrum of the gas to be analyzed. See M. Harwit and N. J. A. Sloane, *Hadamard Transform Optics*, Chapters 1-3, Academic Press, (1979).

The Eigen and Hadamard masks can be fabricated onto a silicon (Si) wafer using standard photolithographic techniques. Double-sided polished Si wafers with resistivity above 20 $\Omega$-cm are preferably used. Wafers can be coated with an anti-reflective coating to prevent detector errors. Thin Si substrates can be used, as long as bowing or flexing of the substrate doesn't occur. Patterning of the wafer can be accomplished through the spinning of a photoresist onto the wafer and patterning with a chrome-on-glass wafer mask. This exposed photoresist is then developed in the appropriate development fluid. Next, evaporation of a highly-reflective material, such as gold, is performed. Lastly, the wafer is soaked in a solvent to remove the remaining photoresist, forming the desired masks on the wafer. Lithography errors should be kept at a minimum. However, errors of up to about 2% have not substantially interfered with measurement making capabilities.

Figure 6:
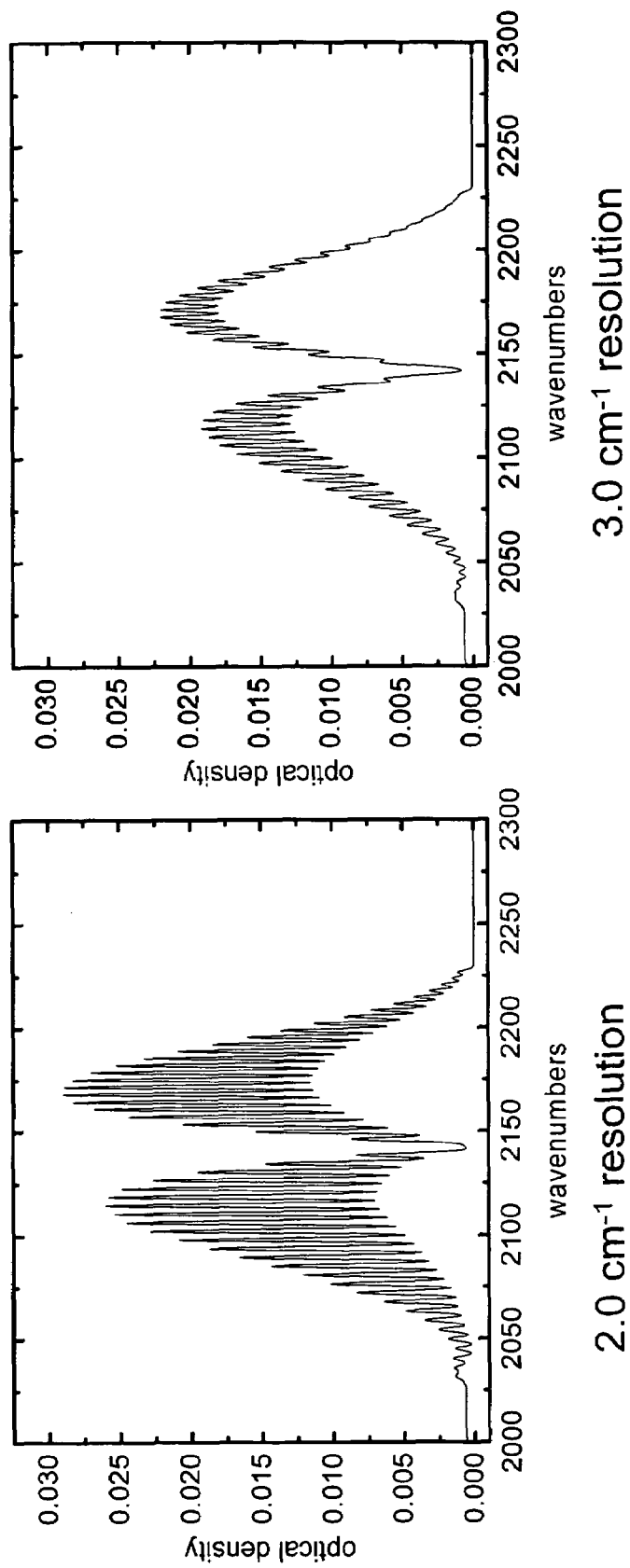
FIG. 6 shows CO spectra at 2.0 $cm^{-1}$ and 3.0 $cm^{-1}$ spectral resolution.

In FIG. 6 is shown the spectrum of CO measured using Hadamard masks with 2.0 $cm^{-1}$ and 3.0 $cm^{-1}$ resolution respectively.

Figure 7:
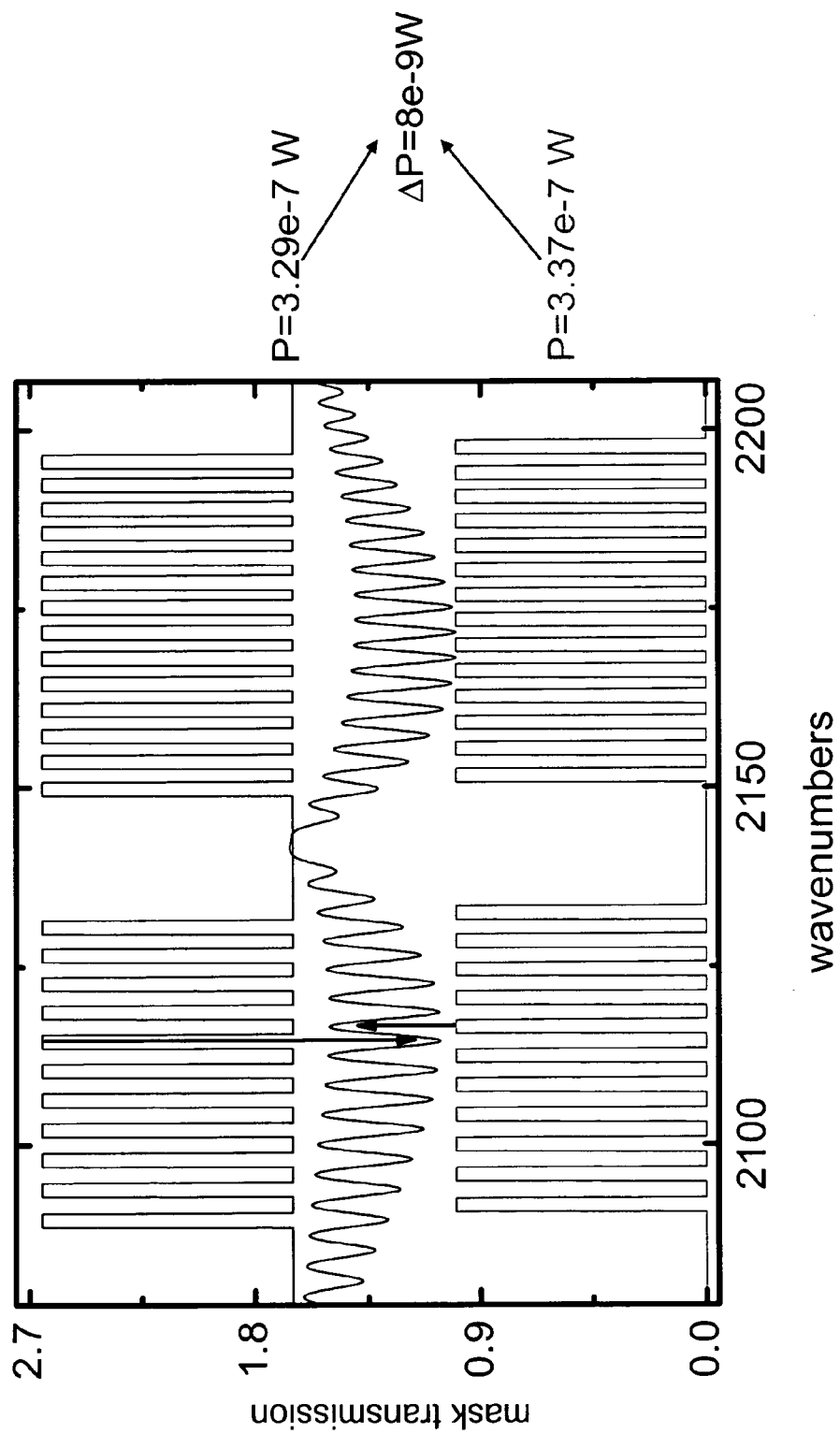
FIG. 7 shows an example plus eigen function (top) and an example minus eigen function (bottom) compared to an actual CO spectrum.

In FIG. 7 is shown a positive Eigen function (top) and a negative Eigen function (bottom) compared to the absorption spectra of CO (middle). Numbers at the right indicate the relative values of the total illumination that will be transmitted through a mask wheel using each mask.

Figure 8:
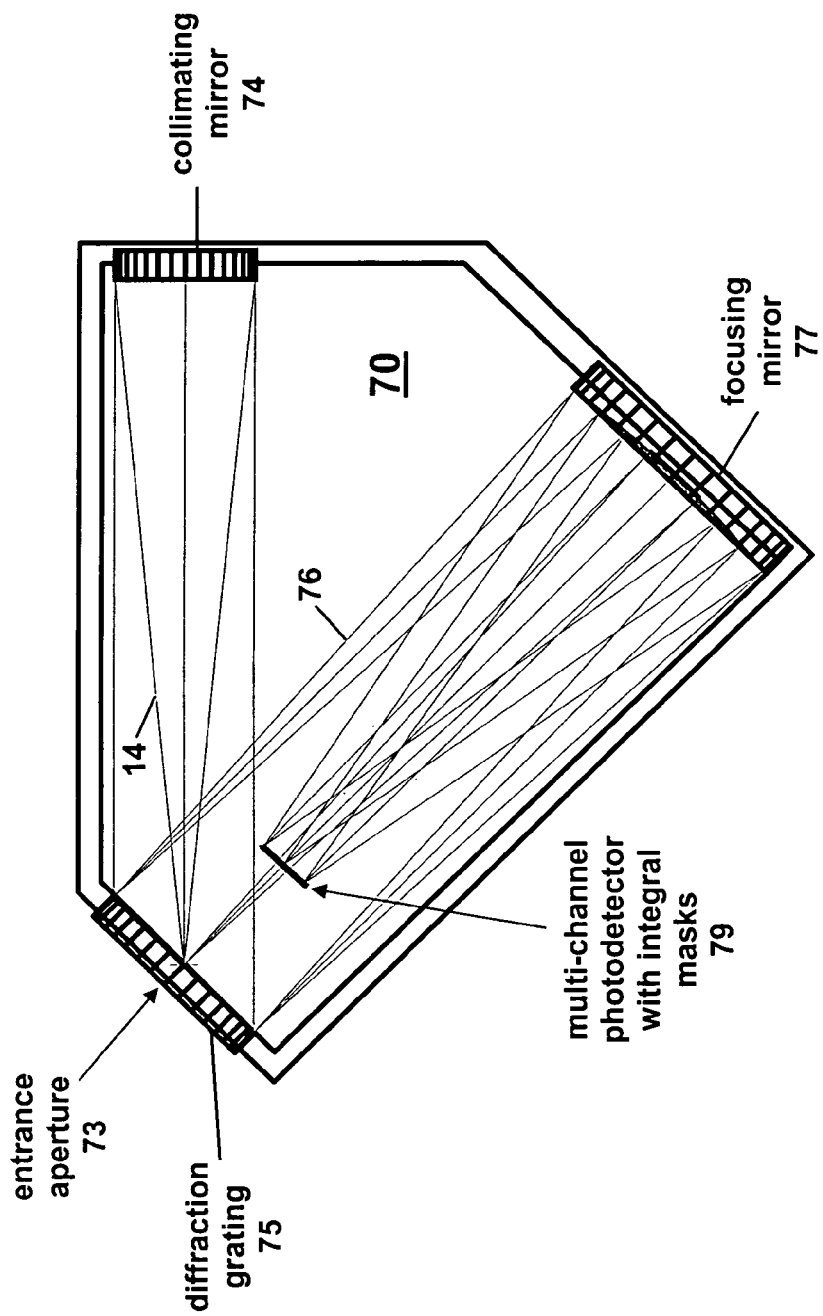
FIG. 8 shows a top view optical layout of a miniaturized correlation spectrometer employing a multi-channel photodetector with integral species-specific masks over each channel.

In FIG. 8 is shown a top view optical design layout of a miniature correlation spectrometer 70. The miniature spectrometer 70 uses only 3 optical elements and has no moving parts. Sample spectrum light 14 enters the spectrometer through an entrance aperture 73. The sample light 14 is collimated by an on-axis parabolic mirror 74 and the collimated sample light retro-reflected to a fixed diffraction grating 75 where it is spectrally dispersed. Preferably, the slit 73 is located at the center of the diffraction grating 75. The spectrally dispersed sample light 76 can be focused by an on-axis focusing mirror 77 onto a photodetector array 79 comprising a plurality of photodetector channels, each channel having an integral species-specific mask that provides species-specific spectral filtering of the sample spectrum light incident on that channel (e.g., two such photodetector channels are shown). The multi-channel photodetector array 79 with integral species-specific masks eliminates the need for the mask wheel of the mask wheel correlation spectrometers 30 and 50 described above. Species-specific masks may be fabricated onto the detector using similar processing methods as those described above. For example, the photodetector channels can be arranged in a 1×n array with a unique Eigen spectra mask patterned over the inlet aperture of each channel. The DC response of each channel is then a measure of the correlation between the sample spectrum light and the Eigen spectra. Thus, by having a simple pair of channels, an A-B spectral difference can be obtained. With multiple channels and Eigen masks, multiple spectral differences can be detected and multi-component mixtures of gases can be monitored.

The present invention has been described as a correlation spectrometer. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A correlation spectrometer, comprising:
    an entrance aperture for allowing sample spectrum light from the sample to enter the spectrometer;
    a collimating section for collimating the sample spectrum light from the entrance aperture onto a diffraction grating, wherein the diffraction grating spectrally disperses the sample spectrum light;
    a telecentric imaging section for focusing the spectrally dispersed light onto a mask wheel, the mask wheel comprising a region of chemical species-specific Eigen masks that correspond to at least one target compound, to provide spectral filtering of the sample spectrum light; and
    a broadband photodetector for recording the spectrally filtered sample spectrum light.

2. The correlation spectrometer of claim 1, wherein the collimating section comprises a collimating lens or a parabolic mirror.

3. The correlation spectrometer of claim 1, wherein the telecentric imaging section comprises a telecentric lens.

4. The correlation spectrometer of claim 1, wherein the mask wheel comprises a reflective mask wheel.

5. The correlation spectrometer of claim 4, wherein the coded masks cause the desired spectral bands to be reflected and the undesired spectral bands to pass on a wavelength-by-wavelength basis.

6. The correlation spectrometer of claim 5, wherein the telecentric imaging section comprises an off-center telecentric lens to spatially separate the reflected spectrally filtered sample spectrum light beam from the incident sample spectrum light beam.

7. The correlation spectrometer of claim 5, wherein the telecentric imaging section comprises a centered telecentric lens and a roof prism or periscope to spatially separate the reflected spectrally filtered sample spectrum light beam from the incident sample spectrum light beam.

8. The correlation spectrometer of claim 1, wherein the mask wheel comprises a transmissive mask wheel.

9. The correlation spectrometer of claim 8, wherein the coded masks cause undesired spectral bands to be reflected and the desired spectral bands to pass on a wavelength-by-wavelength basis.

10. The correlation spectrometer of claim 1, wherein the mask region further comprises a Hadamard mask.

11. A correlation spectrometer for measuring the concentration of at least one target compound in a sample, comprising:
    an entrance aperture for allowing sample spectrum light from the sample to enter the spectrometer;
    a collimating section for collimating the sample spectrum light from the entrance aperture onto a diffraction grating, wherein the diffraction grating spectrally disperses the sample spectrum light;
    an imaging section for focusing the spectrally dispersed light onto a plurality of photodetector channels, each channel comprising an integral species-specific mask, for providing species-specific spectral filtering of the sample spectrum light incident on each channel.

12. The correlation spectrometer of claim 11, wherein the collimating section comprises an on-axis parabolic mirror.

13. The correlation spectrometer of claim 11, wherein the imaging section comprises an on-axis parabolic mirror.

14. A correlation spectrometer, comprising:
    an entrance aperture for allowing sample spectrum light from the sample to enter the spectrometer;

a collimating section for collimating the sample spectrum light from the entrance aperture onto a diffraction grating, wherein the diffraction grating spectrally disperses the sample spectrum light;

a telecentric imaging section for focusing the spectrally dispersed light onto a reflective mask wheel, the mask wheel comprising a region of coded masks that correspond to at least one target compound and wherein the coded masks cause the desired spectral bands to be reflected and the undesired spectral bands to pass on a wavelength-by-wavelength basis, to provide spectral filtering of the sample spectrum light; and a broadband photodetector for recording the reflected spectral bands of the spectrally filtered sample spectrum light.

15. The correlation spectrometer of claim 14, wherein the collimating section comprises a collimating lens or a parabolic mirror.

16. The correlation spectrometer of claim 14, wherein the telecentric imaging section comprises a telecentric lens.

17. The correlation spectrometer of claim 14, wherein the telecentric imaging section comprises an off-center telecentric lens to spatially separate the reflected spectrally filtered sample spectrum light beam from the incident sample spectrum light beam.

18. The correlation spectrometer of claim 14, wherein the telecentric imaging section comprises a centered telecentric lens and a roof prism or periscope to spatially separate the reflected spectrally filtered sample spectrum light beam from the incident sample spectrum light beam.

19. The correlation spectrometer of claim 14, wherein the mask region comprises a chemical species-specific Eigen mask.

20. The correlation spectrometer of claim 14, wherein the mask region further comprises a Hadamard mask.

* * * * *